United States Patent [19]
Hinton

[11] Patent Number: 4,790,017
[45] Date of Patent: Dec. 6, 1988

[54] SPEECH PROCESSING FEATURE GENERATION ARRANGEMENT

[75] Inventor: Harvard S. Hinton, Naperville, Ill.

[73] Assignee: American Telephone and Telegraph Company, AT&T Bell Laboratories, Murray Hill, N.J.

[21] Appl. No.: 942,929

[22] Filed: Dec. 22, 1986

Related U.S. Application Data

[63] Continuation of Ser. No. 474,091, Mar. 10, 1983, abandoned.

[51] Int. Cl.[4] .............................................. G10L 5/00
[52] U.S. Cl. ...................................................... 381/43
[58] Field of Search ................................... 381/41–43; 364/513.5

[56] References Cited

U.S. PATENT DOCUMENTS

| | | | |
|---|---|---|---|
| 4,038,503 | 7/1977 | Moshier | 179/1 SA |
| 4,181,821 | 1/1980 | Pirz et al. | 381/43 |
| 4,282,403 | 8/1981 | Sakoe | 179/1 SD |
| 4,412,098 | 10/1983 | An | 381/43 |

Primary Examiner—Emanuel S. Kemeny
Attorney, Agent, or Firm—Jack S. Cubert

[57] ABSTRACT

In a speech signal recognition system, signals are data-reduced by eliminating highly-transient intervals: each successive time frame is temporarily identified as an anchor frame and compared to m preceding and m succeeding frames, whereby defined uniform time intervals of 2m+1 frames having a prescribed similarity are retained, and highly-transient 2m+1 intervals are discarded.

6 Claims, 4 Drawing Sheets ic feature signals. Control 150 may comprise the
SPEECH PROCESSING FEATURE GENERATION ARRANGEMENT This application is a continuation of application Ser. No. 474,091, filed Mar. 10, 1983, now abandoned.

TECHNICAL FIELD

My invention relates to speech analysis and, more particularly, to recognition of speech patterns.

BACKGROUND OF THE INVENTION

In various types of communication and data processing systems, it is advantageous to use voice interface arrangements for inquiries, commands and exchange of data and other information. The complexity of speech patterns and variations therein among speakers, however, makes it difficult to construct satisfactory automatic speech recognition equipment. Acceptable results have been obtained in special applications restricted to particular individuals and constrained vocabularies. The limited speed and accuracy of automatic speech recognizers, however, has so far precluded wider utilization.

In general, an automatic speech recognition arrangement is adapted to transform an unknown speech pattern into a frame sequence of prescribed acoustic features. These acoustic features are then compared to previously stored sets of acoustic features representative of identified reference patterns. The unknown speech pattern is identified as the closest matching reference pattern. The accuracy of speech recognition is highly dependent on the features that are selected and the criteria used in the comparisons. Acoustic features may be obtained from a spectral, linear predictive or another type analysis of a speech pattern over periods of 5 to 20 milliseconds and the speech pattern features may comprise time frame sequences of spectral distributions or linear prediction coefficients. For an utterance of a single word, the number of time frames may range between 30 to 70 and there may be 10 to 15 spectral distributions or prediction coefficients per frame.

Where a large vocabulary of reference patterns is used, the storage requirements for the reference pattern features and the extended signal processing needed for comparisons of acoustic features result in complex data processing equipment and long delays in pattern identification. It has been recognized that a reduction of the number of feature signals results in an improvement in the cost and speed of recognition. It is difficult, however, to reduce the number of acoustic features without affecting the accuracy of recognition.

U.S. Pat. No. 4,038,503 discloses an arrangement that modifies the time scale of a speech pattern as a function of the changes in spectral distributions and selects representative spectral features for the speech frames. In this way, the number of spectral features is reduced, i.e., by a factor of eight. With respect to linear prediction analysis, U.S. Pat. No. 4,282,403, issued to H. Sakoe on Aug. 4, 1981, describes a method of quantizing prediction parameters to reduce the storage requirements for reference patterns. These techniques are useful in selecting already formed acoustic features for speech frames but do not reduce the number of frames in recognition processing. It is an object of the invention to provide improved speech recognition having both reduced storage and signal processing requirements.

BRIEF SUMMARY OF THE INVENTION

The invention is directed to a speech pattern recognition arrangement in which a sequence of first signals representative of the acoustic features of successive frames of the pattern are generated. The first signals of each successive time frame are compared to the first signals of each of m frames immediately preceding said time frame to generate a signal representative of the similarity between said time frame first acoustic signals and the first acoustic feature signals of the m preceding frames. Each successive time frame is temporarily identified as an anchor frame and its similarity signal is compared to the similarity signals of the m preceding frames and the m succeeding frames. Responsive to the 2m+1 similarity signals being less than a prescribed value, a time interval extending over the 2m+1 successive frames having the prescribed similarity is selected. For each identified 2m+1 time frame interval, a set of second acoustic feature signals is generated responsive to the first acoustic features of said identified 2m+1 time frames to represent the acoustic features of the interval. A plurality of reference pattern templates are stored. Each template similarly comprises a sequence of time intervals each of 2m+1 time frame duration having a set of second acoustic features signals. Jointly responsive to the second acoustic feature signals of the sequence of 2m+1 frame duration time intervals of the speech pattern and the second acoustic feature signals of the sequence of 2m+1 frame duration time intervals of each reference pattern, the speech pattern is identified as one of the stored reference templates.

According to one aspect of the invention, an interval is formed for a group of successive frames having a prescribed degree of similarity.

According to another aspect of the invention, the second signals of a formed speech interval are fewer in number than the frame feature first signals of the speech interval.

DETAILED DESCRIPTION

Figure 1:
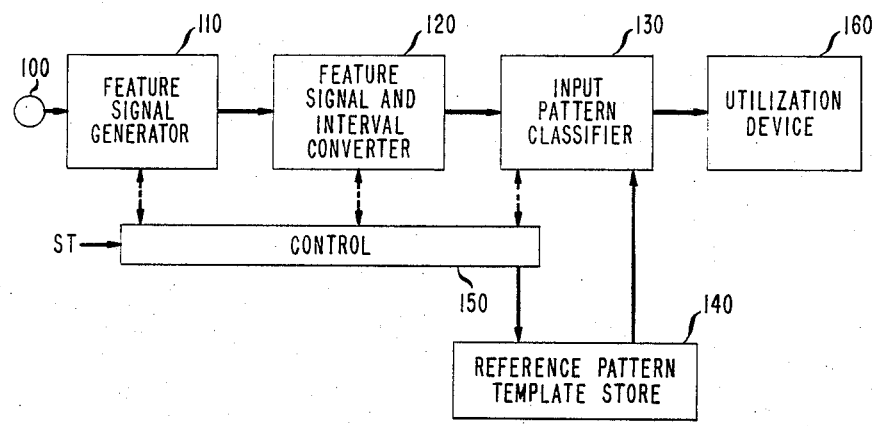
FIG. 1 depicts a general block diagram of a speech recognition arrangement illustrative of the invention.
Figure 6:
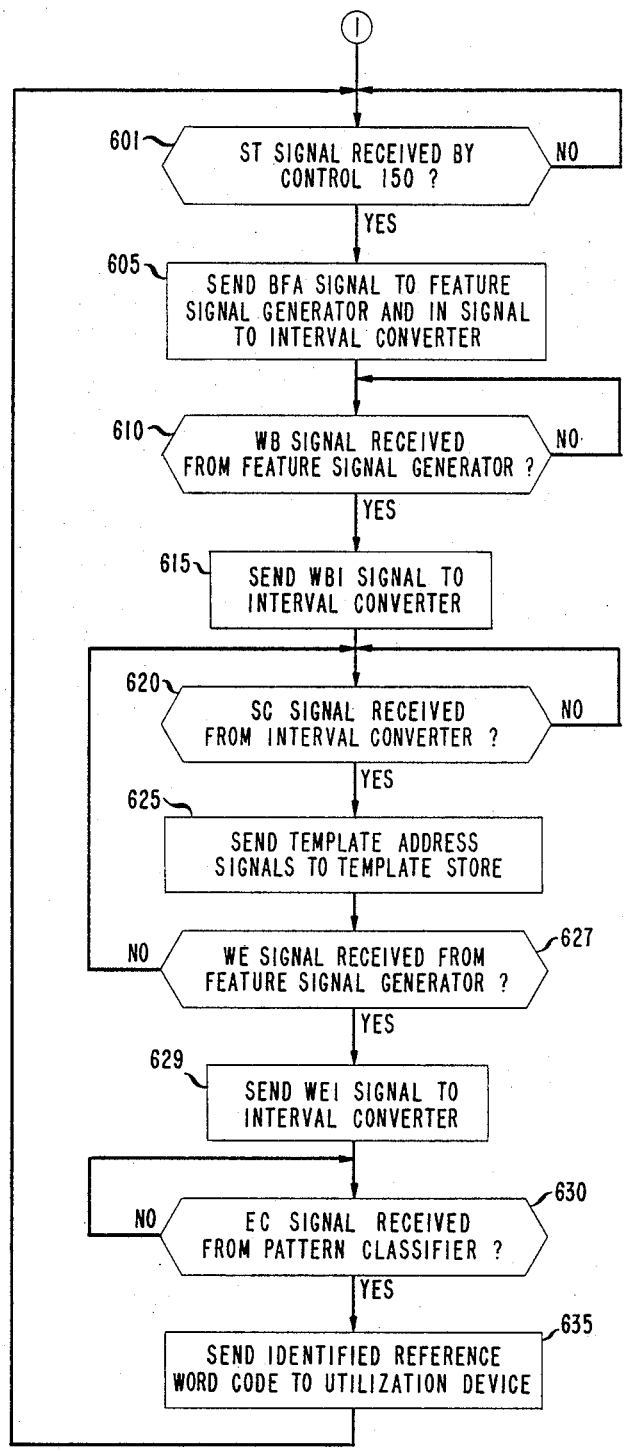

FIG. 1 shows a speech recognition arrangement in which a speech pattern is applied to electroacoustic transducer 100. The electrical signal corresponding to the speech pattern is supplied to feature signal generator 110 from transducer 100. When generator 110 is activated by control 150, it is operative to form a frame sequence of acoustic features $$U = U(1), U(2), \ldots, U(i), \ldots, U(I) \qquad (1)$$

representative of the input speech pattern and to detect the beginning and the end of the speech pattern signal from the feature signals. Control 150 may comprise the system described in the article "Let a Bipolar Processor Do Your Control and Take Advantage of Its High Speed" by Steven Y. Lau appearing on pages 128-139 of the *Electronic Design*, Feb. 4, 1979 or other microprocessor arrangements well known in the art. The operation of control 150 is illustrated in the flow chart of FIG. 6.

For purposes of illustration, the feature signals U(i) of each frame include a set of signals representative of the linear prediction parameters of the frame, $$a_1(i), a_2(i), \ldots, a_p(i) \qquad (2)$$

a signal representative of the speech energy of the frame, a signal representative of the normalized linear prediction error of the frame as defined by $$V(i) = 1 - \sum_{k=1}^{i} a_k r_k \qquad (3)$$

where $$r_k = \frac{R_{xx}(k)}{R_{xx}(0)} \ \& \ 0 \leq V(i) \leq 1, i \geq 0$$

($R_{xx}(k)$ is the $k^{th}$ autocorrelation and $R_{xx}(0)$ is the zero$^{th}$ autocorrelation of the speech samples), and a signal representative of the zero crossing rate of the frame as per $$ZCR_n = \frac{1}{2N} \sum_{0}^{N} sgn[x_m] - sgn[x_{m-1}] \qquad (4)$$

where $$sgn[x_m] = 1 \text{ for } x_m \geq 0$$

$$sgn[x_m] = -1 \text{ for } x_m < 0.$$

It is to be understood that other acoustic features well known in the art or other combinations of such features may also be used.

Feature signal generator 110 may utilize the acoustic feature processing and end point detection arrangements disclosed in U.S. Pat. No. 4,181,821 issued to F. C. Pirz et al Jan. 1, 1980 and assigned to the same assignee, or may comprise a microprocessor arrangement including a type MC6800 microprocessor and well-known associated memory and peripheral circuits functioning in accordance with permanently stored programmed instructions. Appendix A hereto lists such a set of instructions in FORTRAN language form. The type 68000 microprocessor is described in the publication MC68000 16 *Bit Microprocessor User's Manual*, second edition, Motorola, Inc., 1980.

A typical speech pattern analysis for the utterance of a word may, for example, have 36 times frames. There can be up to 15 linear prediction coefficient signals per frame depending on the order of the prediction analysis and three signals corresponding to the energy, the normalized LPC prediction error, and the zero crossing rate of the frame speech signal. According to the invention, feature signal and interval converter 120 is operative to analyze the sequence of frame feature signals to determine groups of successive frames having a predetermined degree of similarity and to form a speech pattern interval for each such group. The frame feature signals for the detected interval are combined into a lesser number of interval features so that there is a reduction of both the number of speech pattern segments and the number of feature signals per feature segment. Typically, 36 speech frames are converted into 4 to 12 speech intervals each having 19 feature signals.

In FIG. 1, converter 120 receives the sequence of frame feature signals of U(i) from generator 110. After the first m frame feature signals are stored in converter 120, a similarity measure signal is formed $$S(i) = \sum_{n=i-m}^{i-1} d(i,n); \qquad (5)$$

where d(i,n) is the Eclidean distance between the linear prediction coefficients for frames i and n. As is apparent from equation 5, signal S(i,n) is small where the acoustic features of frames i and n are very similar and signal S(i,n) is large where the acoustic features of frames i and n are very dissimilar. The S(i) signals are stored and each succession of 2m+1 frames is considered as an interval candidate. Every speech pattern frame is temporarily assigned as a potential center or "anchor" frame for an interval and its similarity measure signal is compared to the similarity measure signals of the m preceding and the m succeeding frames. If the similarity measure signal of the potential anchor frame is equal to or less than the similarity signals of the m preceding and m succeeding frames, a speech pattern interval k is produced and the interval feature signals I(k,j) are generated. These interval feature signals consist of:

$$I(k,j) = \frac{1}{2m+1} \sum_{n=i-2m}^{i} a(n,j) \qquad \text{for } j = 1 \text{ to } p \qquad (6)$$

$$I(k,p+1) = \frac{1}{2m+1} \sum_{n=i-2m}^{i} zcr(n)$$

$$I(k,p+2) = \frac{1}{2m+1} \sum_{n=i-2m}^{i} errn(n)$$

$$I(k,p+3) = \frac{1}{2m+1} \sum_{n=i-2m}^{i} rms(n)$$

where i is the current frame number and k is the $k^{th}$ interval feature signal to be generated for the speech pattern. Thus, the 2m+1 sets of acoustic feature signals each including LPC signals $a_1(i), a_2(i), \ldots a_p(i)$, V(i) and $ZCR_n$ for the 2m+1 time frames assigned to an interval k are replaced by a single set of acoustic feature signals as set forth in equation 6. In terms of the frame sequence of equation 1, each time interval corresponds to a sequence of successive time frames, e.g., from i−m to i+m having an anchor time frame i meeting the criteria that the similarity signal S(i) of equation 5 is less than or equal to the similarity signals of the m preceding and succeeding time frames. The 2m+1 time frames within each time interval k have 2m+1 acoustic feature signal sets U(i−m) to U(i+m) characterizing the interval of frames i−m to i+m and the time interval k has a single set of acoustic feature signals shown in equation 6.

The aforementioned similarity measure arrangements are effective in detecting speech pattern portions that are relatively stable so that feature signals representative thereof can be generated. In speech patterns such as uttered words, unvoiced sounds at the beginning and end thereof require special attention. In order to accommodate word beginnings and endings, converter 120 is rendered operative to compare the features of the first B frames and the final E frames of an input speech pattern to predetermined criteria if no interval has been selected in the speech pattern portion. When the prescribed criteria have been met, a first or last interval is set and feature signals for such intervals are generated in accordance with equation (6). The maximum zero crossing rate of the first B and final E frames may be compared to a threshold value to determine if and where an initial or final interval should be formed.

Reference pattern template store 140 in FIG. 1 contains sequences of interval feature signals of identified reference patterns. As is well known in the art, the reference feature signal templates may be formed in a training mode using feature signal generator 110 and feature signal and interval converter 120 to produce interval feature signals for previously identified patterns. The reference templates in store 140 are compared to the sequence of interval feature signals of an unknown speech pattern from converter 120 in input pattern classifier 130 responsive to signals from control 150. Classifier 130 determines the reference pattern that is most similar to the input speech pattern feature sequence, generates a reference pattern identity signal for the closest corresponding template, and supplies the reference pattern identity signal to utilization device 160.

Figure 2:
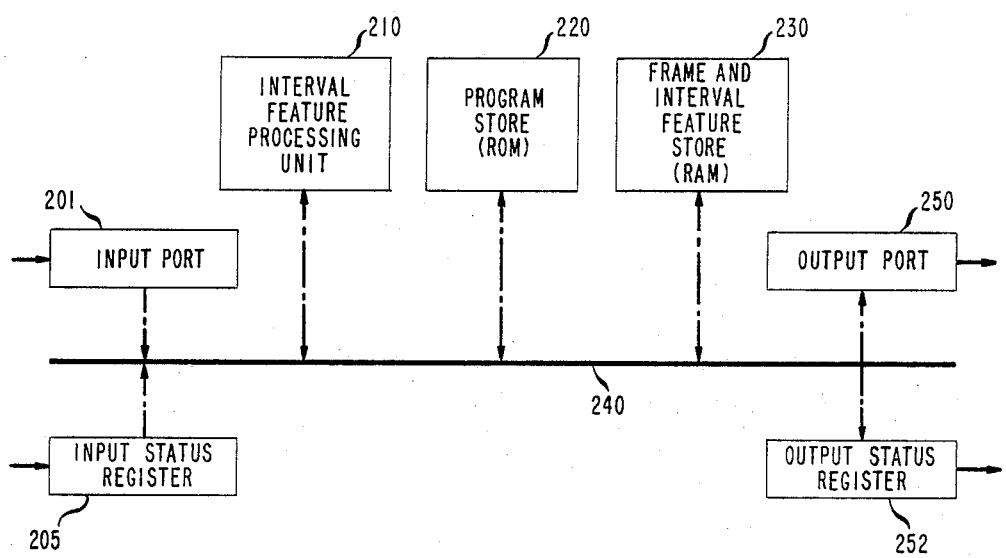
FIG. 2 shows a block diagram of a circuit that may be used as the feature signal and interval converter in FIG. 1.

Feature signal and interval converter circuit 120 is shown in greater detail in FIG. 2. Referring to FIG. 2, the converter comprises interval feature processor 210 which may be the aforementioned type 68000 microprocessor, program store 220, frame and interval feature store 230, input port 201, input status register 205, output 205, output port 250, output status register 252 and bus 240. Program store 220 is a read only memory containing a set of program instructions listed in FORTRAN language in Appendix B hereto. Feature signal store 230 is a random access memory adapted to store frame feature signals from feature signal generator 110, similarity measure signals and interval feature signals produced in feature processor 210 as well as intermediate and control signals necessary for the operation of processor 210.

Input port 201 is adapted to receive time frame feature signals from feature signal generator 110 and to transfer the frame feature signals to store 230. Input status register 205 receives signals from generator 110 indicative of the availability of frame feature signals therefrom. Output port 250 receives interval feature signals from store 230 for transfer to pattern classifier 130 in FIG. 1, and output status register 252 is adapted to selectively transfer control signals indicative of the availability of interval feature signals from store 230. Control and feature signals are transferred among the component blocks of FIG. 2 via common bus 240.

Figure 3:
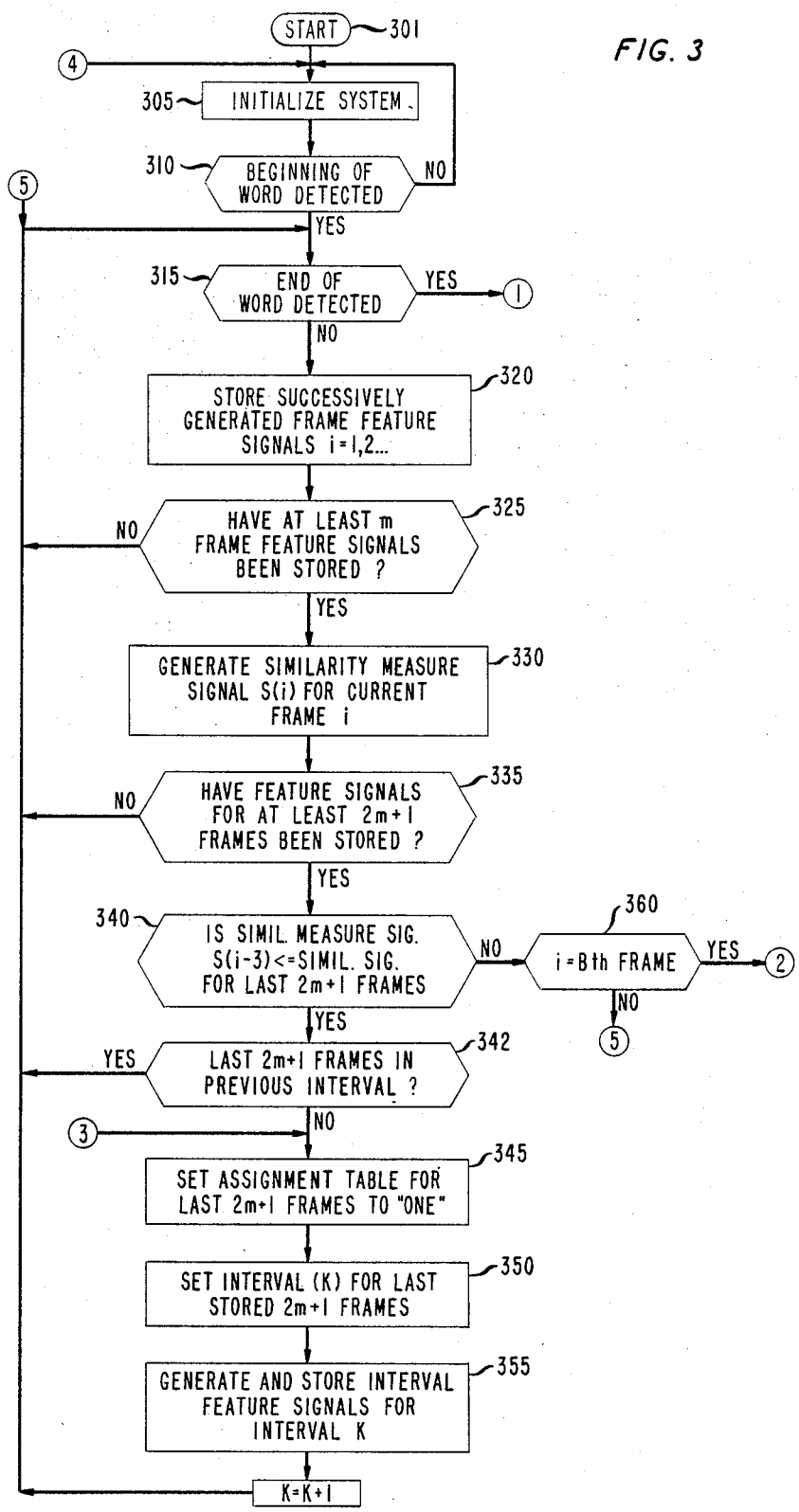
FIGS. 3, 4 and 5 depict flow charts illustrating the method of converting speech pattern frames and frame features to intervals and interval features according to the invention; and, FIG. 6 depicts a flow chart illustrating the operation of the control arrangements in FIG. 1.
Figure 4:
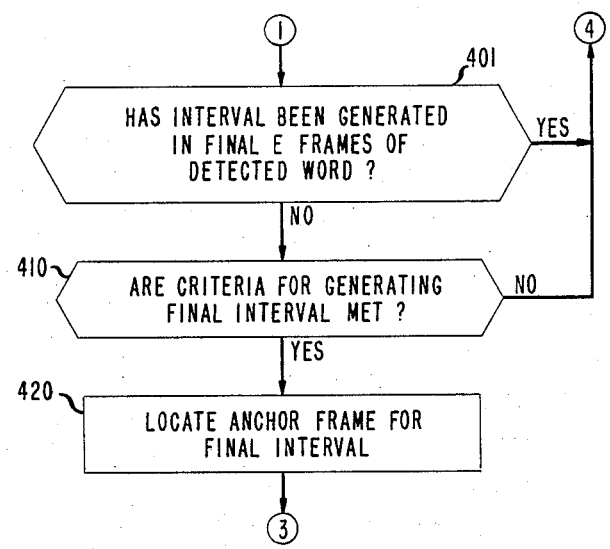
Figure 5:
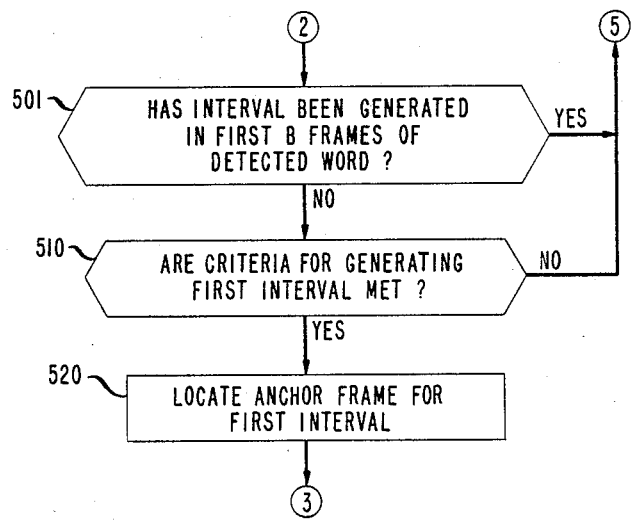

The operation of the arrangement of FIG. 2 is illustrated in the flow charts of FIGS. 3, 4 and 5. When the circuit of FIG. 1 is turned on, an ST start signal is applied to control 150. Responsive thereto, control 150 applies a BFA begin feature analysis signal to feature signal generator 110 and an IN initialize signal to converter 120 as per decision box 601 and operation box 605 of FIG. 6. As indicated in box 305 of FIG. 3, signal IN causes converter 120 to reset interval and frame parameters preparatory to receiving speech pattern frame and feature signals from generator 110.

When the beginning of a spoken work pattern is detected in feature signal generator 110, a word begin WB signal is transmitted from generator 110 to processing control 150 as indicated in box 610 and a WBI signal is sent from control 150 to processing unit 210 (box 615) via input port 201 and input status register 205. Operation box 320 is entered via box 210 and end of word detected decision box 315. In accordance with box 320, the successive frame feature signals formed in generator 110 are transferred to frame and interval feature store 230 via input port 201 under control of processing unit 210 and program store 220. The successively received frame feature signals are stored in frame and interval feature store 230 as addressed by frame index i in the loop including boxes 315, 320 and 325. Time frame feature signals are stored for use in interval feature processing unit 210 to determine speech pattern intervals by similarity analysis and to form speech interval feature signals for use in input pattern classifier 130. Such time frame feature signal storage is required until the interval feature signals have been generated for the speech pattern. With respect to reference templates, however, the reference pattern time frame feature signals are discarded and reference pattern template store 140 stores only the reference pattern interval feature signals.

After at least m frame features are stored in RAM 230, operation box 330 is entered via decision box 325. AS per box 330, a similarity signal S(i) is generated by processor unit 210 for each successive frame. Each S(i) signal is representative of the sum of the Euclidean distances $$d(n,q) = \sqrt{(a_1^n - a_1^q)^2 + (a_2^n - a_2^q)^2 + \ldots (a_p^n - a_p^q)^2} \quad (7a)$$

$$S(i) = \sum_{j=1}^{m} d(i, i - j). \quad (7b)$$

It is to be understood that other measures of similarity may be used and that other distance formulae well known in the art may be employed. The generated similarity signals are stored in RAM 230 as addressed by frame index $i$.

The loop including boxes 315, 320, 325, 330 and 335 is iterated to produce a succession of S(i) similarity signals until the feature signals of at least 2m+1 frames have been processed. Upon storage of the S(2m+1) signal for the current frame $i$, box 340 is entered from decision box 335 and the similarity measures for the last 2m+1 frames are compared to the similarity measure signal S(i−3)≦S(p), p=i, i−1, ..., i−6, an interval of successive similar frames has been detected that can be represented by a smaller set of feature signals without a significant loss of accuracy. Upon detection of a sequence of similar frames in box 340, box 342 is entered. RAM store 230 of FIG. 2 includes an interval assignment table in which there are "one" entries for frames assigned to formed intervals and "zero" entries for frames not assigned to intervals. The assignment table is scanned as per box 342 to determine if any of the last 2m+1 frames has been included in a previously formed interval. If so, box 320 is reentered via box 315 to store the features of the next frame i+1 without setting a new interval. In the event that none of the last 2m+1 frames has been assigned to an interval, the assignment table is updated (box 345) by placing "one" codes in the last 2m+1 frame positions and the interval k is set for the last stored 2m+1 frames (box 350).

The $k^{th}$ interval feature signals are then formed in processor unit 210 and are stored in RAM 230 as addressed by interval index k (box 350). The feature signals for each interval include linear prediction coefficients formed from the current interval frame LPC coefficient signals, an interval energy signal, an interval zero crossing rate signal, an interval residual error signal, and the interval similarity signal shown in equation (6) and produced as per box 355. These interval feature signals replace the (2m+1) (18) frame feature signals for the 2m+1 frames of the interval in the classification operations of classifier 130 of FIG. 1 so that the classification processing for each reference pattern is greatly reduced. If the conditions of decision box 340 are not satisfied and i is not the Bth frame in box 360, box 315 is reentered. In this way, only time intervals having 2m+1 similar time frames are selected whereby each time interval represents a portion of the speech pattern which comprises a consistent sequence of time frames. Time frames that do not meet the conditions of box 340 are not represented in the sequence of time intervals $k=1, 2, \ldots$ since they are not part of a sequence of frames with consistent acoustic features.

In the event that a succession of 2m+1 similar frames is not detected in decision box 340 for current frame i, box 360 is activated to determine if the current frame is the termination frame B, e.g., B=10, of the beginning of the input word pattern. When i=B, the operations shown in the flow chart of FIG. 5 are performed to generate an initial time interval based on the zero crossing rate feature signals of frames 1 to B. Box 501 in FIG. 5 is entered and processor unit 210 is rendered operative to detect whether a feature signal interval has been produced in the first B frames of the input pattern. If such an interval has been formed to characterize the pattern beginning frames, box 315 is reentered. Otherwise, the maximum zero crossing feature signal of the first B frames is compared to a threshold value, e.g., 0.4. If a frame having the maximum zero crossing signal for the designated interval equal to or greater than the threshold is detected, it is designated as the anchor frame for an initial interval in box 520, the initial interval is set (box 345), and its feature signals are produced (box 350) as previously described. In the absence of a frame satisfying the conditions of decision box 510, control is passed to box 315 in FIG. 3.

The interval forming process shown in FIG. 3 is performed for each frame of the input word pattern until the end of the pattern is detected in feature signal generator 110. At that time, a WE signal is sent to control 150 as per box 627 and a word end WEI control signal is passed to converter 120 from control 150 (box 629). Responsive to receipt of signal WE by processor unit 210, control is transferred to box 401 of FIG. 4 from decision box 315. The flow chart of FIG. 4 illustrates the generation of a final interval characterizing the end portion of the input word pattern. Referring to FIG. 4, the formation of a feature signal interval in the last E, e.g., 10, frames of the speech pattern is detected in processor unit 210 as per box 401. If a feature signal interval has already been generated, box 305 is entered and the circuit of FIG. 2 is returned to its initial state to await a signal from control 150 indicating the beginning of a new speech pattern. Where no feature signal interval has been formed in the last E frames, box 410 is entered and processor unit 210 is operative to compare the maximum zero crossing rate feature signal of the last E frames to a predetermined threshold value. Upon detection of a frame satisfying the conditions of box 410, an anchor frame for a final interval is designated in box 420. The final interval is set in box 345, the feature signals for the final interval are generated as per box 355 and box 305 is then entered via boxes 315 and 401. If no frame meets the criterion of box 410, control is passed to initialization box 305.

The interval feature signals produced in processing unit 210 are stored in frame and interval feature signal store 230 and are made available to pattern classifier 130 of FIG. 1 under control of signals from controller 150. After the first interval feature signals are stored, controller 150 receives an SC signal from converter 120 to initiate the input speech pattern classification operation (box 620). Responsive to signal SC, controller 150 sends reference template addressing signals to reference pattern template store 140 (box 625) so that the succession of input speech pattern interval feature signals may be compared to the corresponding reference template interval feature signals. The comparison may be accomplished by any of the arrangements well known in the art. The sequence of input pattern interval features may be directly matched to the reference template interval features or dynamic time warping may be employed to take into account variations in feature pattern length and articulation. The arrangement disclosed in U.S. Pat. No. 4,181,821 issued to F. C. Pirz et al may be employed except that interval feature signals are used instead of frame feature signals. Alternatively, each input speech pattern interval feature signal may be compared to the all possible candidate interval feature signals independent of the generation of later input speech pattern interval feature signals utilizing well-known tree structures. There is a substantial reduction in the time required for classification of the input pattern since the time frames of the speech pattern are converted into a lesser number of intervals and the time frame features are transformed into fewer interval features. Further, the storage requirements for reference patterns are also reduced since the patterns comprise interval features.

Upon completion of the input pattern classification in classifier 130, an EC end classification signal is sent to control 150 from the classifier and a code corresponding to the reference pattern identified in the classifier is applied to utilization device 160 (boxes 630 and 635). Box 610 is then reentered via boxes 601 and 605 so that the next recognition operation may be performed.

While the invention has been shown and described with reference to a particular illustrative embodiment, it is to be understood that various modifications may be made by those skilled in the art without departing from the spirit and scope of the invention.

What is claimed is:

1. A speech pattern recognition arrangement comprising:
    means for partitioning an input speed pattern into successive time frame portions $i=1, 2, \ldots, i, \ldots, I$;
    means responsive to each speech pattern time frame portion i for generating a set of first signals U(i) representative of the acoustic features of the time frame portion;
    means responsive to the time frame sequence of first signals of the speech pattern for successively forming a plurality of speech pattern time intervals k, each time interval comprising a set of 2m+1 successive time frames of said speech pattern, the first signals of the time interval 2m+1 successive time frames having a prescribed degree of similarity;
    means responsive to the first signals of the 2m+1 time frames of each speech pattern interval k for generating a set of second signals I(k,1), I(k,2), . . .

, I(k,p+3) representative of the acoustic features of said interval;

means for storing a plurality of reference pattern templates, each template comprising an interval sequence of second signals corresponding to a reference pattern; and means jointly responsive to said speech pattern time interval sequence of second signals and said reference pattern time interval sequence of second signals for identifying said speech pattern as one of said reference patterns;

said speech pattern time interval forming means comprising:

means for sequentially designating each successive frame i is an anchor time frame for the set of time frames i−m to i+m;

means responsive to the first signals of the anchor time frame i and the first signals of the m time frames i−1, i−2, ... , i−m preceding said anchor time frame for comparing the first signals of said anchor time frame i with the first signals of each of the m time frames i−1, i−2, ... , i−m preceding said anchor time frame i to generate m signals S(i−1), S(i−2), ... , S(i−m) representative of the similarity between said anchor time frame i first signals and the first signals of each of the m preceding time frames i−1, i−2, ... , i−m;

means responsive to the similarity signal S(i) of the designated anchor time frame being less than or equal to each of the similarity signals S(i−m), S(i−m+1), ... , S(i+m) for the preceding m time frames and the succeeding m time frames for generating a signal identifying the time interval of said 2m+1 successive time frames i−m, i−m+1, ... , i+m as a second signal time interval; and means responsive to said identification signal for assigning said 2m+1 successive time frames from time frame i−m to i+m to a speech pattern time interval k.

2. A speech pattern recognition arrangement according to claim 1 wherein each speech time frame first signal comprises a set of q distinct acoustic feature signals; and said second signal generating means comprises:

means responsive to the (2m+1)q first signals of the 2m+1 time frames of each formed speech pattern time interval for producing a set of r<(2m+1)q second signals representative of the acoustic feature signals of said speech pattern interval, each of said second signals being representative of a statistic of the first signals of the 2m+1 time frames of the speech pattern time interval.

3. A speech pattern recognition arrangement according to claim 2 wherein said speech pattern time frame feature signals include a set of linear predictive coefficient signals, a signal representative of the acoustic energy of the time frame, a signal representative of the prediction residual of the time frame, a signal representative of the zero crossing rate of the time frame; and said speech pattern time interval feature signals include a signal corresponding to the average of the 2m+1 sets of time frame linear prediction coefficient signals of the time interval, signal corresponding to the average of the 2m+1 time frame acoustic energy signals of the time interval, a signal corresponding to the average of the 2m+1 time frame prediction residuals of the time interval, and a signal corresponding to the average of the 2m+1 time frame zero crossing rate signals of the time interval.

4. A method for recognizing a speech pattern comprising the steps of:

partitioning an input speech pattern into successive time frame portions i=1, 2, ... , i, ... , I;

generating a set of first signals U(i) representative of the acoustic features of the time frame portion responsive to each speech pattern time frame portion i;

successively forming a plurality of speech pattern time intervals k responsive to the time frame sequence of first signals of the speech pattern, each time interval comprising a set of 2m+1 successive time frames of said speech pattern and the first signals of the time interval 2m+1 successive time frames having a prescribed degree of similarity;

generating a set of signal signals I(k,1), I(k,2), ... , I(k,p+3) representative of the acoustic features of said interval responsive to the first signals of the 2m+1 time frames of each speech pattern interval k;

storing a plurality of reference pattern templates, each template comprising an interval sequence of second signals corresponding to a reference pattern; and identifying said speech pattern as one of said reference patterns jointly responsive to said speech pattern time interval sequence of second signals and said reference pattern time interval sequence of second signals;

said speech pattern time interval forming step including:

sequentially designating each successive time frame i as an anchor time frame for the set of time frames i−m to i+m;

comparing the first signals of said anchor time frame i with the first signals of each of the m time frames i−1, i−2, ... , i−m preceeding said anchor time frame i to generate m signals S(i−1), S(i−2,), ... , S(i−m) representative of the similarity between said anchor time frame i first signals and the first signals of each of the m preceding time frames i−1, i−2, , ... , i−m response to the first signals of anchor time frame i and the first signals of the m time frames i−1, i−2, ... , i−m preceding said anchor time frame;

generating a signal identifying said time interval of said 2m+1 successive time frames i−m, i−m+1, ... , i−m as a second signal time interval responsive to the similarity signal S(i) of the designated anchor time frame being less than or equal to each of the similarity signals S(i−m), S(i−m+1), ... , S(i+m) for the preceding m time frames; and assigning said 2m+1 successive time frames from time to frame i−m to i+m to a speech pattern time interval responsive to said identification signal.

5. A method for recognizing a speech pattern according to claim 4 wherein:

each speech time frame first signal comprises a set of q distinct acoustic feature signals; and said second signal generating step comprises:

producing a set of r<(2m+1)q second signals representative of the acoustic feature signals of said speech pattern interval responsive to the (2m+1)q first signals of the 2m+1 time frames of each formed speech pattern time interval, each of said second signals being representative of a statistic of the first signals of the 2m+1 time frames of the speech pattern time interval.

6. A method for recognizing a speech pattern according to claim 5 wherein said speech pattern time frame feature signals include a set of linear predictive coefficient signals, a signal representative of the acoustic energy of the time frame, a signal representative of the prediction residual of the time frame, a signal representative of the zero crossing rate of the time frame; and said speech pattern time interval feature signals include a signal corresponding to the average of the 2m+1 sets of time frame linear prediction coefficient signals of the time interval, signal corresponding to the average of the 2m+1 time frame acoustic energy signals of the time interval, a signal corresponding to the average of the 2m+1 time frame prediction residuals of the time interval, and a signal corresponding to the average of the 2m+1 time frame zero crossing rate signals of the time interval.

* * * * *